INVENTOR.
PHILIP E. FRAZIER
BY
ATTORNEY.

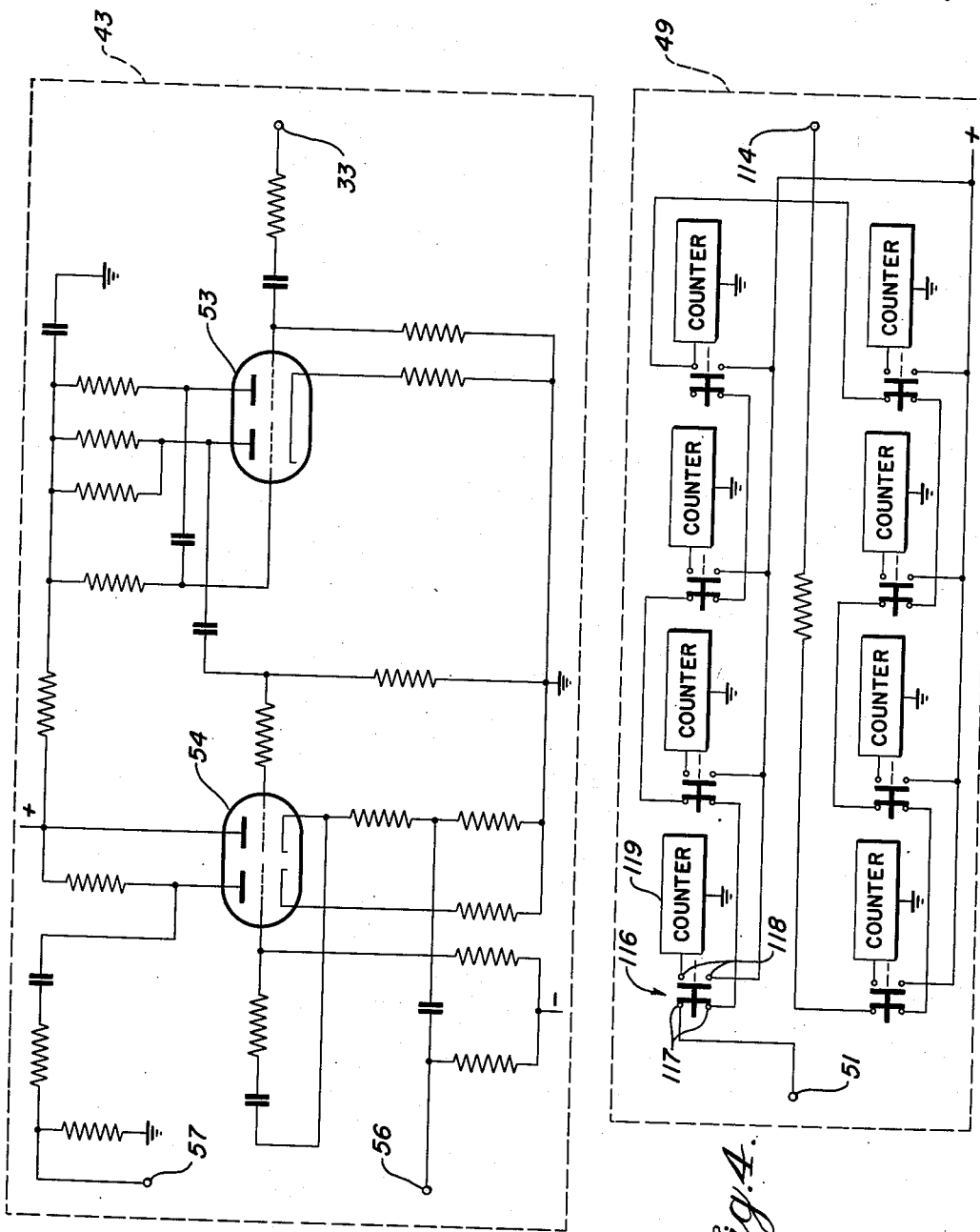

Patented June 1, 1954

2,680,212

UNITED STATES PATENT OFFICE 2,680,212

PROTECTIVE CIRCUIT

Philip E. Frazier, Berkeley, Calif., assignor to the United States of America as represented by the United States Atomic Energy Commission Application July 1, 1953, Serial No. 365,356

8 Claims. (Cl. 315—132)

The present invention relates, in general, to an electronic circuit for monitoring and controlling power circuits and, more particularly, to a protective circuit adapted for cooperation with such as parallel-connected ignitrons for recording various types of operating faults thereof and for de-energizing the tubes upon the occurrence of operating faults of predetermined seriousness.

The use of mercury-pool gas tubes or ignitrons as high power rectifiers and inverters is quite common and it is conventional to employ these tubes in parallel banks to increase the power capacity thereof; however, faulty operation of one tube of such a parallel combination may be quite damaging to the other tubes and to the load supplied through the tubes. Consequently, some type of monitoring means is ordinarily employed in connection with parallel-connected ignitrons and in some cases automatic controls are also employed to de-energize the ignitrons. Commonly, however, only certain types of tube failures or faults are contemplated and guarded against by the protective circuits so that incomplete protection is provided by the control or monitoring means.

In general, the faults that occur in the operation of parallel-connected tubes in an inverter or rectifier circuit allow the counter or opposing voltage in the output transformer to drop to zero causing the power supply to be short circuited. These faults are sometimes generically termed arc-throughs; however, these faults may be more properly defined as arc-throughs, misfires, and arcbacks. An arc-through results from failure of the tube to hold a forward voltage and may be due to improper operation of the grid control circuit, overloading of the tube, or other causes. Misfire is the failure of the tube to conduct at the predetermined anode and grid voltage and in parallel tube operation may be produced, for example, by an arc-through of the parallel tube which prevents full anode voltage from being applied to the tube misfiring. Arcback is the reverse firing of the tube wherein electrons flow from the anode to the cathode upon reversal of anode voltage. The above-identified faults produce characteristic results which are employed in the present invention to identify the type of fault, and to de-energize the parallel tube circuit protected by the invention. An arc-through produces a negative signal at the anode of the tube in the absence of a trigger pulse. A misfire produces no signal at the anode of the faulty tube when the trigger pulse is applied, and an arcback produces a positive signal at the anode of the faulty tube in the absence of a trigger pulse. It is by the use of these characteristic signals that the present invention protects circuits employing parallel tube operation from damage.

It is an object of the present invention to provide an improved protective circuit for parallel-connected power tubes.

It is an object of the present invention to provide improved control means for parallel tubes and adapted to de-energize the tubes upon faults in the operation thereof.

It is an object of the present invention to provide improved monitoring means for parallel-connected tubes, such as ignitrons, that indicates the occurrence and type of faults in tube operation.

It is an object of the present invention to provide an improved monitoring means for parallel-connected tubes that indicates arc-through, arc-back, and misfire of the tubes.

It is an object of the present invention to provide an improved monitoring circuit for rectifiers and inverters which have parallel-connected tubes and adapted to de-energize same upon the occurrence of faults in the tube operation and to indicate the type of operating fault.

It is an object of the present invention to provide an improved protective circuit for inverter and rectifier circuits employing parallel-connected tubes that de-energize the circuits protected upon faults in the tube operation and which indicates the type of fault and counts the number of each type of fault occurring.

Various other objects and advantages of the invention will become apparent to those skilled in the art from the following description taken together with the accompanying drawing of a preferred embodiment of the invention and wherein:

Figure 3 is a wiring diagram of the blanking circuit of the protective circuit; and Figure 4 is a wiring diagram of the counting and reset circuit of the protective circuit.

Figure 1:
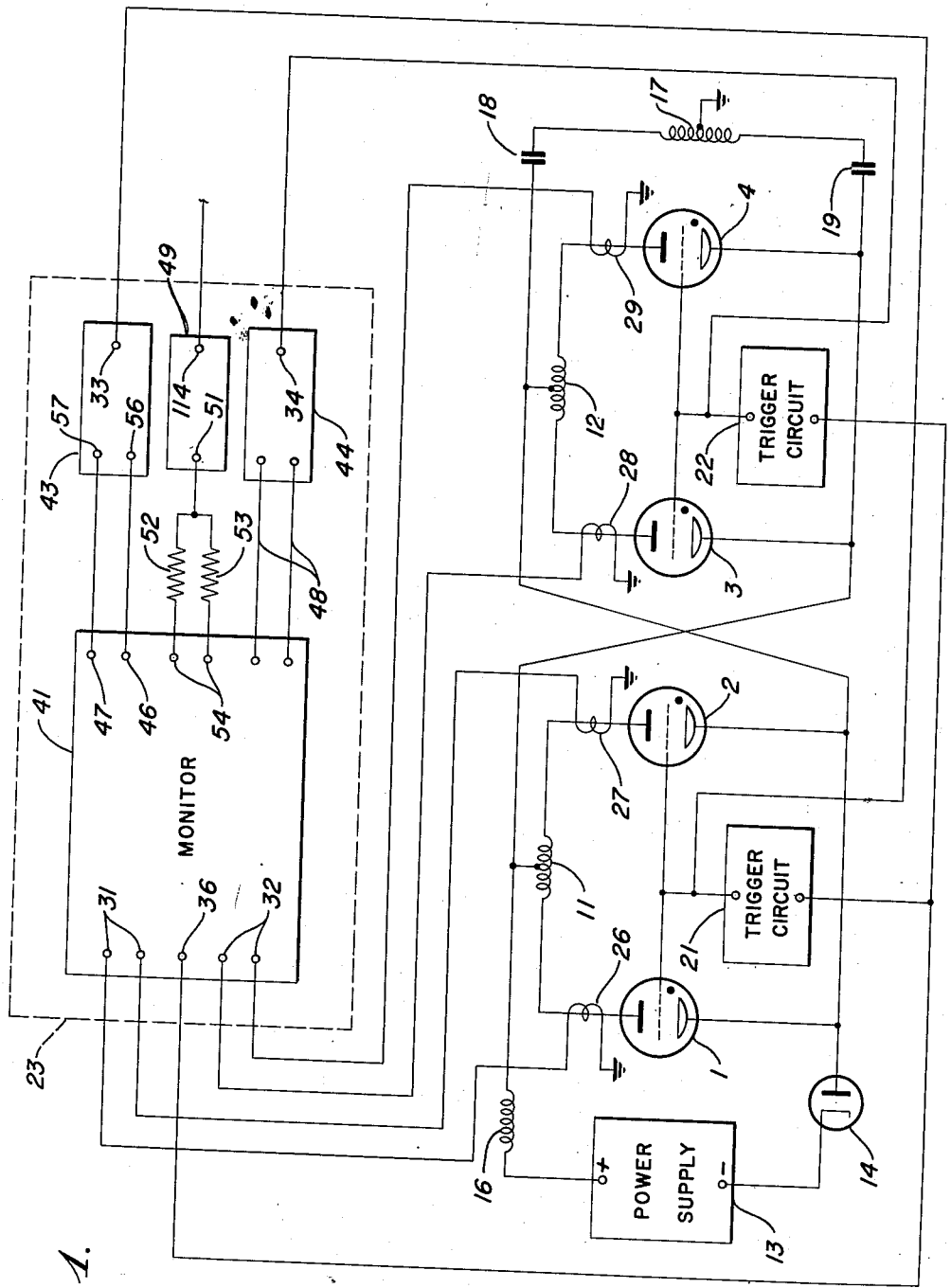
Figure 1 is a wiring diagram of an inverter circuit with the protective circuit of the present invention shown in block form and connected to the inverter circuit.

Considering first a typical circuit that may be protected by the present invention, there is shown in Fig. 1 an inverter circuit including a pair of parallel-connected leading tubes 1 and 2, and a second pair of parallel-connected lagging tubes 3 and 4. There may be employed in circuits of this type various types of tubes such as, for example, mercury-pool gas tubes, and in such case ignitors would also be employed and energized in the same manner as the control electrodes of the tubes. Leading tubes 1 and 2 have their cathodes directly connected together and their anodes connected through a load dividing inductor 11, while the lagging tubes 3 and 4 are similarly connected in that their cathodes are tied together and their anodes joined through a second load dividing inductor 12. The circuit is energized by a power supply 13 which has the negative terminal thereof connected through a triode vacuum tube 14 to the cathodes of leading tubes 1 and 2. The positive terminal of power supply 13 is connected through a current limiting conductor 16 to the midpoint of inductor 11, and also to the cathodes of tubes 3 and 4, while the cathodes of tubes 1 and 2 are connected to the midpoint of inductor 12. It will thus be seen that the tubes 1 to 4 are connected in inverse parallel relationship and the load, illustrated as a center-grounded inductor 17, is connected through capacitors 18 and 19 to the center tap of lagging inductor 12 and to the center tap of leading inductor 11, respectively. Controlled conduction of the leading and lagging tubes is accomplished by trigger circuits 21 and 22 of which the former energizes control electrodes of the leading tubes 1 and 2 and the latter energizes control electrodes of the lagging tubes 3 and 4.

It will be apparent that there has been described above an inverter circuit wherein energization of the power supply 13 charges the capacitors 18 and 19 so that in response to the trigger signals from trigger circuits 21 and 22, the leading and lagging tubes alternately conduct to produce an alternating current through the load 17. Such a circuit, as that described and illustrated, is conventionally employed to produce alternating current from a direct current source; however, it will be readily apparent that faulty operation of one or more of the tubes in the circuit will result in an overload of the parallel-connected tube and will further improperly vary the load current and voltage quite possibly to the detriment of the load circuit. The inverter circuit and the load thereof may be protected by a protective circuit 23 and in order to accomplish complete protection signals must be obtained from a number of places in the inverter circuit and applied to the protective circuit. There are thus provided current transformers 26, 27, 28, and 29 which are connected in the anode leads of inverter tubes 1 to 4, respectively. One terminal of each of these current transformers or reactors is grounded and of the leading tubes the ungrounded current transformer leads are connected to terminals 31 of the protective circuit, while the ungrounded leads of the current transformers 28 and 29 are connected to terminals 32 of the protective circuit. Additional information is provided to the protective circuit 23 by leads connected from the grid circuits of the leading and the lagging tubes to protective circuit terminals 33 and 34, respectively. The inverter tubes are de-energized upon the occurrence of faults in their operation by de-energizing the trigger circuits thereof, and for this purpose there is connected a lead from these trigger circuits to the output terminal 36 of the protective circuit 23.

Considering now the invention itself as to the construction and operation of a preferred embodiment thereof, reference is made to the block diagram of the invention in Fig. 1 wherein the protective circuit is divided into component parts for ease of description. There is included in the protective circuit 23 a monitor 41 which has the current transformer signals applied thereto at terminals 31 and 32 and a pair of blanking circuits 43 and 44 which accept the trigger signals at terminals 33 and 34, respectively. The blanking circuits 43 and 44 are identical so that only circuit 43 is later described in detail and same is connected to monitor 41 by a pair of leads extending between terminals 46 and 47 on monitor 41 and terminals 56 and 57 on blanking circuit 41; blanking circuit 44 is connected to monitor 41 by a pair of leads 48. There is additionally provided a reset and counting circuit 49 through which monitor 41 is energized and connection is made from a terminal 51 on the reset and counting circuit to the juncture of a pair of like resistors 52 and 53 that are each connected to one of the terminals of a terminal pair 54 on the monitor 41.

Before considering the operation of the protective circuit 23 described above in general terms, it is necessary to consider the circuits of the individual portions thereof and thus a general description of the overall protective operation is deferred so as to follow the detailed circuit descriptions below. It is to be noted that while the invention is adapted to indicate and operate in response to arc-throughs, arcbacks, and misfires on all tubes of the inverter circuit the illustrated monitor circuit 41 is simplified for the purpose of description so that the leading portion thereof operates only upon arc-throughs and misfires of the leading tubes and the lagging portion thereof operates only upon arcbacks and misfires of the lagging tubes.

Considering first the blanking circuits 43 and 44, there is illustrated only one of these circuits inasmuch as both are identical. In circuit 43, for example, as illustrated in Fig. 3, there is provided a double triode vacuum tube 53 connected through a capacitor and resistor to the input terminal 33 and further connected as a one shot multivibrator. The output of multivibrator 53 is taken from the anode of the second portion thereof and capacitively coupled to the grid of the second section of a second double triode vacuum tube 54, which operates as a signal inverter. Two separate output signals are obtained from the inverter tube 54, the first of which is obtained from the cathode circuit of the first section of the tube and is capacitively coupled to an output terminal 56 that is also connected through a resistor to a source of negative voltage. The second output is obtained from the anode of the second section of the tube 54 and is capacitively coupled through a resistor to an output terminal 57, which is grounded through another resistor. Although there are numerous circuit elements connected with the tubes 53 and 54 of the blanking circuit, the connections and use of these elements are conventional and are thus not believed to require explanation. With regard to the operation of this circuit, it will be seen that a positive input pulse from the trigger circuit 21 of the leading inverter tubes 1 and 2, when applied to the blanking circuit input terminal 33, causes a positive voltage to be applied to the control electrode of the second section of double triode vacuum tube 54. This causes a positive voltage in the cathode circuit of this section of the tube which is applied to output terminal 56 to momentarily overcome the negative bias thereof. There is also produced at the anode of the second section of double triode vacuum tube 54 a negative voltage pulse which is applied to the output terminal 57. These voltage signals at the blanking circuits at the output terminals 56 and 57, or the absence of such signals, are employed to control the operation of the monitor circuit 41 as explained below.

Figure 2:
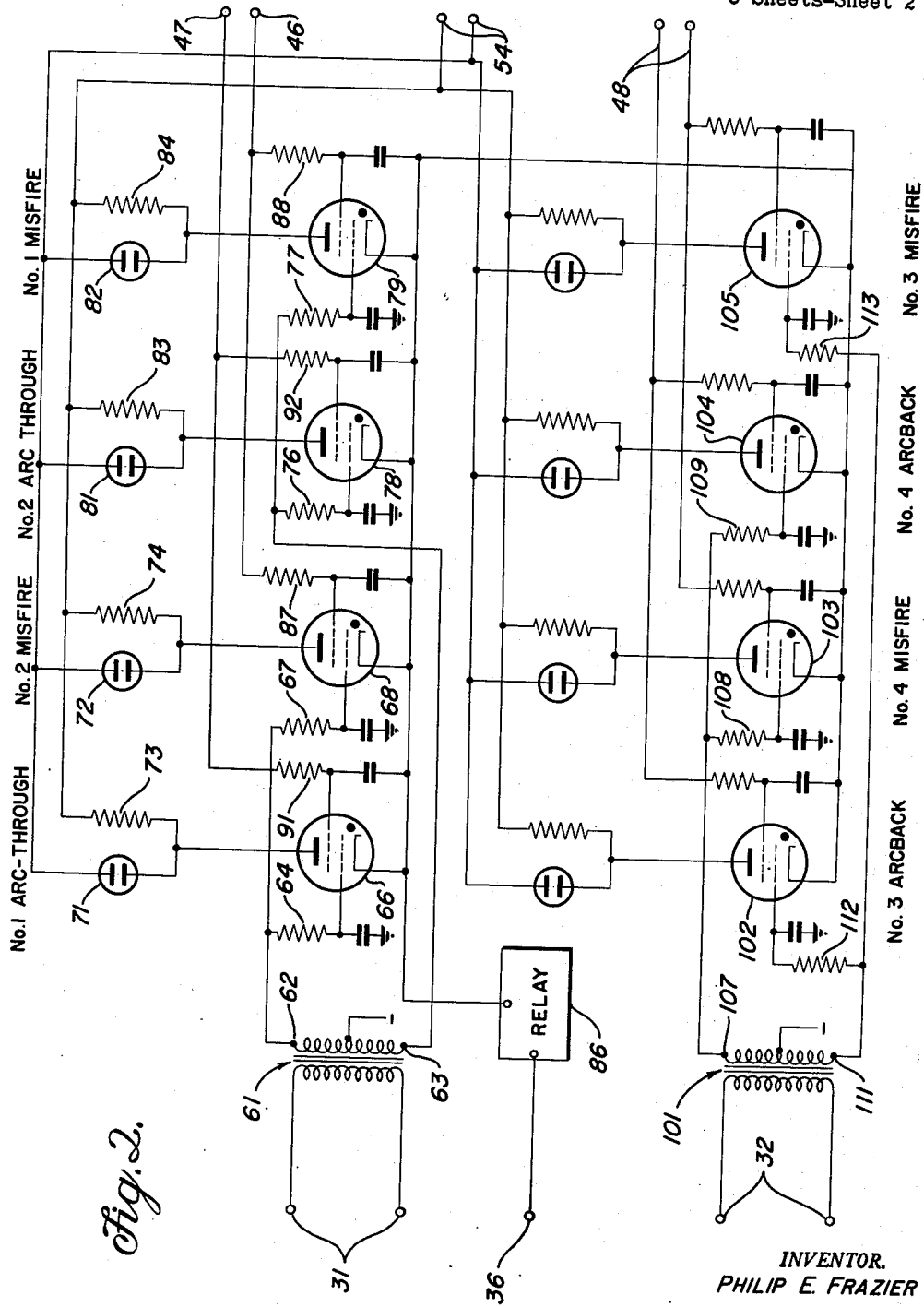
Figure 2 is a wiring diagram of the monitor of the protective circuit.

The monitor circuit 41 will be seen from Fig. 2 to comprise two similar portions of which the upper or leading portion receives signals at terminals 31 and at terminals 46 and 47 from the leading inverter tubes 1 and 2 and of which the lower or lagging portion receives signals at terminals 32 and 48 thereof from the lagging inverter tubes 2 and 3. Looking first to the leading portion of the monitor 41, the primary winding of a transformer 61 is connected across the input terminals 31 thereof which are externally connected to the current transformers 26 and 27 in the anode circuits of leading inverter tubes 1 and 2. A negative voltage is applied to the midtap of the secondary winding of transformer 61 to maintain end terminals 62 and 63 thereof at a negative potential in the absence of signals from the inverter circuit. Connection is made from transformer secondary terminal 62 through a resistor 64 to the first control electrode of a gaseous discharge tube 66 having a control electrode and a screen electrode, hereinafter both termed as control electrodes because they are so employed in the circuit, and through a resistor 67 to the first control grid of another like gaseous discharge tube 68. The anodes of tubes 66 and 68 are connected through neon bulbs 71 and 72, respectively, to one terminal of terminal pair 54 and through resistors 73 and 74 to the other terminal thereof; tube plate voltage is supplied through terminals 54 as noted below. The other secondary terminal 63 of monitor input transformer 61 is connected through resistors 76 and 77, respectively, to the first control electrodes of gaseous discharge tubes 78 and 79 like tubes 66 and 68, while the anodes of tubes 78 and 79 are connected through neon bulbs 81 and 82, respectively, to one terminal of terminal pair 54 and through resistors 83 and 84, respectively, to the other terminal thereof. The cathodes of tubes 66, 68, 78, and 79 are all tied directly together and are connected to a relay 86 which, in turn, is connected through terminal 36 to the trigger circuits 21 and 22 for controlling the operation thereof.

In addition to the input signals from input transformer 61, there are also applied to the leading portion of monitor 41 signals from blanking circuit 43. As noted above, blanking circuit 43 normally maintains output terminal 56 at a small negative potential and output terminal 57 at ground potential and monitor terminals 47 and 46 are thus normally grounded and negatively biased, respectively. Monitor terminal 46 is connected through resistors 87 and 88 to the second control grids of gaseous discharge tubes 68 and 79, respectively, while monitor terminal 47 is connected through resistors 91 and 92 to the second control electrodes of gaseous discharge tubes 66 and 78, respectively. The second control electrode of each of the discharge tubes may be capacitively coupled to the tube cathodes and the first control electrode of each tube may be grounded through a capacitor, all as shown, while grounding switches may also be provided in the first control electrode circuit of each tube for test purposes, if desired.

Similar to the above-described leading portion of the monitor 41, there is provided in the lagging portion thereof an input transformer 101 connected across the input terminals 32 that are, in turn, connected to the current transformers 28 and 29 in the anode circuits of the lagging inverter tubes 3 and 4. Four like gaseous discharge tubes 102—105 are provided with their cathodes tied directly together and to the cathodes of tubes 66, 68, 78, and 79 of the leading portion of the monitor. The anode circuits of each of the tubes 102 to 105 are like those of tube 68, for example, in comprising a parallel-connected resistor and neon bulb with the anode circuits being parallel-connected to monitor terminals 54. The top end 107 of the secondary winding of transformer 101 is connected through resistors 108 and 109 to the first control electrodes of tubes 103 and 104, respectively, while the opposite end 111 is connected through resistors 112 and 113 to the first control electrode of tubes 102 and 105. The second control grids of tubes 102—105 are connected to the blanking circuit 44 with the electrodes of tubes 102 and 104 being resistance coupled to the grounded blanking circuit terminal and the electrodes of tubes 103 and 105 being connected to the negatively biased terminal of blanking circuit 44 in the same manner as tubes 66, 68, 78, and 79 are connected to blanking circuit 43.

There is additionally provided in the protective circuit 23 means for counting tube faults and for directly de-energizing the inverter tubes 1—4 upon the occurrence of particular operating faults, and same is shown in Fig. 4 wherein the output terminal 51 of reset and counting circuit 49 is connected to the anode circuit of the monitor tubes and an input terminal 114 is adapted for connection to a source of positive voltage (not shown). The input and output terminals 114 and 51 are connected in series through eight switches 116, each of which has two sets of contacts with the first set 117 being disposed in series connection between the input and output terminals and the other set 118 being connected between a voltage source and a conventional counter 119 which is grounded. The switches 116 are loaded so as to normally close the first set of contacts 117 thereof whereby anode voltage is supplied to monitor 41, and the switches are adapted for manual reset to open contacts 117, thereby cutting off the monitor anode plate voltage and closing contacts 118 to energize the counter 119 connected thereto.

Considering now the operation of the protective circuit and referring first to the protection of the leading tubes 1 and 2 of the inverter, it will be seen that the monitor tubes are supplied plate voltage through the normally closed switches 116 of reset and counter circuit 49. The monitor tubes are normally maintained in a non-conducting state by the negative bias applied to the secondary midtap of the monitor input transformers 61 and 101 and thence to the tube control electrodes. Relay 86 operates to energize the trigger circuits 21 and 22 of the inverter circuit in the absence of a signal applied thereto from the leading or lagging portions of the monitor 41. In normal operation parallel-connected leading inverter tubes 1 and 2 simultaneously conduct in response to a trigger pulse applied to the control electrodes and are rendered nonconducting by the reverse anode voltage thereof. During the nonconducting periods of tubes 1 and 2 no signal is applied to the monitor input terminals 31 so the tubes thereof remain nonconducting, and during simultaneous conduction of inverter tubes 1 and 2 equal signals are produced in current transformers 26 and 27 and applied through monitor input terminals 31 to opposite ends of the primary winding of the transformer 61 so that no signal is produced in the secondary winding thereof and the monitor tubes remain conducting.

With regard to faulty operation of inverter tubes 1 or 2, misfire of tube 1, or in other words, failure of tube 1 to fire upon application of a trigger pulse thereto, produces no signal at current transformer 26 as the anode of tube 1 does not change potential; however, a negative signal is produced at the anode of tube 2 as this tube is rendered conducting by the trigger pulse simultaneously applied thereto. The negative pulse at the anode of tube 2 is applied through reactor 27 to the lower terminal 31 and reverses polarity in the monitor transformer 61 to produce a positive pulse at the lower terminal 63 of the transformer secondary. This positive pulse is applied through resistors 76 and 77 to the first control electrodes of gas discharge tubes 78 and 79. The negative bias remains on the control electrodes of tubes 66 and 68 so that they remain nonconducting and the positive voltage applied to the first control grids of tubes 78 and 79 would render both of these tubes conducting were it not for the second control grids and the potentials impressed thereon by the blanking circuit 43. The trigger pulse from trigger circuit 21 that initiated conduction of inverter tube 2 and should have initiated conduction of inverter tube 1 is applied to blanking circuit 43 at terminal 33 thereof. This positive pulse causes the second or right hand portion of double triode vacuum tube 53 to conduct which, in turn, cuts off the first or left hand portion and applies a positive pulse to the control electrode of the right hand portion of double triode tube 54 thereby driving the cathode thereof more positive. This positive cathode pulse is applied through a capacitor to terminal 56 to momentarily overcome the negative bias thereof whereby the potential of blanking circuit terminal 56 and monitor terminal 46 attached thereto is driven at least to ground potential. This positive or ground potential is applied through resistors 87 and 88 to the second control electrodes of gaseous discharge tubes 68 and 79 so that tube 79 thereby conducts as the first control grid is positive, as noted above, and the second control grid is at least at ground potential, while tube 68 remains nonconducting by virtue of the negative bias from transformer 61 impressed on the first control grid thereof. Conduction of the second portion of tube 54 which raises the cathode potential thereof applies a positive signal to the grid of the first section of the tube to lower the plate potential thereof and thus to apply a negative pulse to the output terminal 57 for overcoming the ground bias thereof. This negative pulse is applied through monitor terminal 47 and thence through resistors 91 and 92 to the second control grids of tubes 66 and 78 to prevent same from conducting. Thus, of the four tubes in the leading portion of monitor 41 only tube 79 has a positive potential applied to both grids and thus only this tube conducts. As tube 79 conducts the anode potential drops to provide a sufficient voltage difference across neon tube 82 to light same, and inasmuch as tube 79 is a gaseous discharge tube, it continues to conduct even after removal of the positive control electrode voltages. Conduction of tube 79 draws current through relay 86 which thereby actuates same to de-energize the trigger circuits 21 and 22 of the inverter and continued conduction of tube 79 retains relay 86 in actuated position so that the inverter circuit is rendered inoperative and the faulty tube operation may be checked and remedied.

The inverter circuit is only rendered operative after a tube 1 misfire by discontinuing conduction of monitor tube 79 and this is accomplished by removing the plate voltage thereof in reset and counter circuit 49. The individual switches and associated counters of reset and counter circuit 49 are preferably arranged or identified with individual neon bulbs of monitor 41 so that each switch-counter combination corresponds to one tube and bulb of the monitor. In the considered instance of misfire of tube 1, the fourth tube 79 and neon bulb 82 thereof are actuated so that the fourth switch 116 should be operated or actuated to open switch contacts 117 and to close switch contacts 118. As switch contacts 117 are connected in series with the plate supply of the monitor tubes, opening these contacts de-energizes the monitor tube, here tube 79, so that it ceases to conduct and relay 86 is de-energized so as to return to normal condition wherein trigger circuits 21 and 22 are energized. Closing switch contacts 118 connects the counter 119 thereof in series between the positive voltage at terminal 114 and ground so that current flows through the counter to actuate same and a mechanical register may be included in the counter 119 to record the number of times that the reset switch 116 is operated as a count of the number of misfires of tube 1, for example.

Operation of the protective circuit as a result of misfire of tube 2 and arc-through of tubes 1 or 2 is quite similar to the above-described operation in connection with misfire of tube 1. Thus, arc-through of tube 2, for example, produces a negative pulse at the anode thereof in the absence of a trigger pulse as the tube conducts prior to the application and this negative tube pulse will be applied through a polarity reversal in transformer 61 as a positive pulse on the first control grids of monitor tubes 78 and 79. In the absence of a trigger pulse, blanking circuit terminals 56 and 57 retain their normal bias potentials which are negative and ground respectively. Thus, the second grid of tube 78 is at ground potential so that it conducts with the above-noted positive pulse applied to its first control grid and tube 79 is held nonconducting by the negatively biased second control grid from blanking circuit terminal 56. Only tube 78 conducts to light the neon bulb 81 thereof as an indication of an arc-through of tube 2 and the remainder of the operation of the protective circuit is the same as set out above in connection with misfire of tube 1 except that the third reset switch 115 is operated to resume operation of the inverter circuit. Similarly, arc-through of tube 1 and misfire of tube 2 causes monitor tubes 66 and 68, respectively, to conduct and remain conducting until their anode voltage is momentarily interrupted by actuation of the corresponding reset switch.

It will be appreciated that three separate signal combinations are possible from each inverter tube corresponding to the three types of faulty operation thereof and of these a negative voltage from the anode together with the presence or absence of a trigger pulse to the tube has been above discussed. Additionally, an arcback at one of the inverter tubes produces, by virtue of the reverse current flow, a positive pulse at the tube anode in the absence of a trigger pulse. For convenience of description only the lagging inverter tubes 3 and 4 are illustrated as being monitored for arcbacks and considering the lagging portion of monitor 41, it is noted that tubes 102 and 104 indicate or operate upon arcbacks of inverter tubes 3 and 4, respectively, while tubes 103 and 105 conduct in response to misfires of tubes 4 and 3, respectively. Considering briefly the sequence of operation following an arcback of tube 3, there is produced at the tube anode a positive pulse which is transmitted via current transformer 28 to the upper terminal of monitor terminals 32. This signal is applied to the primary of input transformer 101 and there is thus produced in the secondary winding thereof a pulse which drives the terminal 111 positive. There is thus applied a positive voltage to the first grids of tubes 102 and 105; however, there is no trigger pulse so there remains impressed from blanking circuit 44 a negative voltage on the second grid of tube 105 so that this tube remains nonconducting. The ground potential applied to the second grid of tube 102 from blanking circuit 44 does not prevent the positive potential applied to the first grid thereof from rendering the tube conducting so that the neon bulb associated therewith is lit and the trigger control relay 86 is energized to de-energize the trigger circuits. Here again manual reset or momentarily breaking the tube circuit cuts off the tube 102 and counts the arcback on the appropriate counter. Misfire is handled by the lagging portion of the monitor in the same manner as in the leading portion.

While only examples of operation have been set out, operation of the circuit is quite similar for each type of operating fault with two signals or lack thereof being applied to each tube in the monitor and such tubes acting to de-energize the inverter circuit when themselves energized by a particular operating fault of a certain inverter tube and retaining the inverter circuit in such condition until the circuit is reset. While manual reset is illustrated, it will be apparent that automatic reset means may be employed, preferably including time delay means and operating to lower or cut off the monitor tube anode voltage so that the tube is rendered nonconducting and the inverter circuit re-energized.

Although the present invention has been disclosed with respect to a single preferred embodiment it will be apparent to those skilled in the art that numerous modifications and variations are possible within the spirit and scope of the invention and thus it is not intended that the invention be limited except by the terms of the following claims.

What is claimed is:

1. A protective circuit for pairs of parallel-connected gaseous discharge tubes having trigger means producing a trigger pulse energizing said tubes for simultaneous operation of the tubes of each pair and comprising, relay means operatively connected to said trigger means for deenergizing same upon relay actuation, a plurality of monitor tubes connected in circuit with said relay means for actuating same by conduction of one of said monitor tubes, means normally biasing said monitor tubes to cut-off, means impressing the anode signal of each of said gaseous discharge tubes upon certain of said monitor tubes, and means impressing said trigger pulse on alternate monitor tubes for controlled conduction thereof in response to predetermined operating faults of said gaseous discharge tubes.

2. Protective means for a circuit including a pair of parallel-connected gaseous discharge tubes and trigger means applying spaced trigger pulses thereto for producing simultaneous conduction thereof comprising, four parallel-connected gaseous discharged monitor tubes each having two control electrodes and being normally biased to cut-off, a pair of reactors cooperating one with each of said discharge tubes for impressing anode signals thereof upon control electrodes of alternate monitor tubes, means impressing said trigger pulses upon alternate monitor tubes whereby noncoincidence of trigger pulse and anode signal of one of said discharge tubes biases one of said monitor tubes to conduct, and control means normally energizing said trigger means and operatively connected to said monitor tubes for actuation by conduction of one of same to prevent the application of trigger pulses to said discharge tubes.

3. Protective means for a pair of parallel-connected gaseous discharge tubes having trigger means producing simultaneous tube conduction at predetermined intervals and comprising a plurality of normally non-conducting parallel-connected gaseous discharge monitor tubes operatively connected to said trigger means for de-activating same upon conduction of a single monitor tube, each of said tubes having a pair of control electrodes, means impressing anode signals of each of said pair of discharge tubes upon control electrodes of separate pairs of monitor tubes and the trigger means signals upon control electrodes of alternate pairs of monitor tubes, and a plurality of counters associated one with each monitor tube for counting the times each tube conducts.

4. Protective means for parallel-connected gaseous discharge tubes having a trigger circuit producing trigger pulses controlling tube conduction comprising, a normally nonconducting monitor tube, a relay connected to said monitor tube and to said trigger means for de-energizing said trigger means upon conduction of said monitor tube, said monitor tube having a first control electrode connected to receive anode signals of one of said gaseous discharge tubes and a second electrode connected to receive said trigger pulses whereby said monitor tube conducts upon misfire of said gaseous discharge tube and the trigger means is thereby de-energized.

5. Protective means as defined in claim 4 further characterized by said monitor tube being a gaseous discharge tube whereby same continuously conducts following initiation of conduction, reset means including a switch connected in series with said monitor tube for removing anode voltage therefrom to cut same off, and a counter connected to said reset means for operation by said switch to count misfires of the tube protected.

6. Protective means for parallel-connected gaseous discharge tubes having trigger means initiating conduction thereof comprising relay means connected to de-energize said trigger means upon relay actuation, four parallel-connected gaseous discharge monitor tubes each having first and second control electrodes and being operatively connected to said relay means for actuating same by conduction of one monitor tube, means negatively biasing the first control electrode of each of said monitor tubes for maintaining said tubes normally nonconducting, a pair of reactors connected one in each anode circuit of said protected tubes, a transformer having the primary winding thereof connected between said reactors and the secondary winding thereof connected between the first control electrodes of the first and second monitor tubes and the first control electrodes of the third and fourth monitor tubes whereby anode signals of said protected tubes are impressed upon the first control electrodes of said monitor tubes, and a blanking circuit having a first normally grounded terminal connected to the second control electrodes of the first and third monitor tubes and a second normally negatively biased terminal connected to the second control electrode of said second and fourth monitor tubes and said blanking circuit being connected to said trigger means for producing in response to outputs thereof a negative pulse at said first terminal and a positive pulse at said second terminal whereby particular faults in the operation of said protected tubes causes a particular one of said monitor tubes to conduct and de-energize said trigger means for preventing renewed conduction of said protected tubes.

7. Protective means as claimed in claim 6 further defined by four switches each having first normally closed contacts connected in series with said four monitor tubes and second normally open contacts, and four counters connected individually to said second switch contacts whereby conduction of said monitor tubes is terminated by opening the corresponding first switch contact and thereby closing the second switch contact to register a count on said counter as a tube operating fault.

8. A protective circuit for pairs of parallel-connected electronic tubes simultaneously operated by trigger means and comprising switch means connected to said trigger means for de-energizing same to cease tube conduction, signal means connected in circuit with the anode of each of said parallel-connected tubes for reproducing anode signals thereof; a monitor operatively connected to said switch means for actuating same and including gaseous discharge tubes having individually impressed thereon the output of said signal means and said trigger means for continuous conduction following a tube operating fault as indicated by the impressed signals, said monitor including a discharge tube for each type of fault indicated on each tube to be protected and said tubes being connected in parallel with visual indicating means in circuit with each monitor tube for identifying the type and location of operating faults in said protected tubes; and a plurality of individual counting means removably connected in series with said monitor for de-energizing same and recording tube operating faults.

No references cited.